United States Patent [19]
Ueda et al.

[11] Patent Number: 5,889,623
[45] Date of Patent: Mar. 30, 1999

[54] HOLDING FRAME AND DISPLAY APPARATUS INCORPORATING THE SAME

[75] Inventors: Hiroomi Ueda, Nara; Akira Murakami, Yamatokoriyama, both of Japan

[73] Assignee: Sharp Kabushiki Kaisha, Osaka, Japan

[21] Appl. No.: 912,557

[22] Filed: Aug. 18, 1997

[30] Foreign Application Priority Data

Aug. 26, 1996 [JP] Japan ................................. 8-224181

[51] Int. Cl.$^6$ ........................... G02B 7/02; G02F 1/1333
[52] U.S. Cl. ............................................. 359/819; 349/58
[58] Field of Search ........................ 359/811, 819; 349/16, 58

[56] References Cited

U.S. PATENT DOCUMENTS

| | | | |
|---|---|---|---|
| 4,915,341 | 4/1990 | Takahashi | 349/58 |
| 5,005,947 | 4/1991 | Sibilo et al. | 359/819 |
| 5,119,239 | 6/1992 | Iaquinto et al. | 359/811 |
| 5,375,005 | 12/1994 | Komano | 349/58 |
| 5,570,267 | 10/1996 | Ma | 349/58 |
| 5,631,756 | 5/1997 | Itazawa | 349/58 |
| 5,659,376 | 8/1997 | Uehara et al. | 349/58 |
| 5,703,665 | 12/1997 | Muramatsu et al. | 349/58 |

FOREIGN PATENT DOCUMENTS

| | | |
|---|---|---|
| 6-138443 A | 5/1994 | Japan . |
| 6-347762 | 12/1994 | Japan . |

*Primary Examiner*—Loha Ben
*Attorney, Agent, or Firm*—Dike, Bronstein, Roberts & Cushman, LLP; David G. Conlin; William J. Daley, Jr.

[57] ABSTRACT

A holding frame includes a first surface, a second surface opposing the first surface, a plurality of inner sides, and a plurality of outer sides, for accommodating a display device within the plurality of inner sides. The holding frame includes at least one first protruding portion for receiving an external force applied to the display device. The at least one first protruding portion is provided on an inner edge which corresponds to one of the plurality of inner sides.

12 Claims, 15 Drawing Sheets

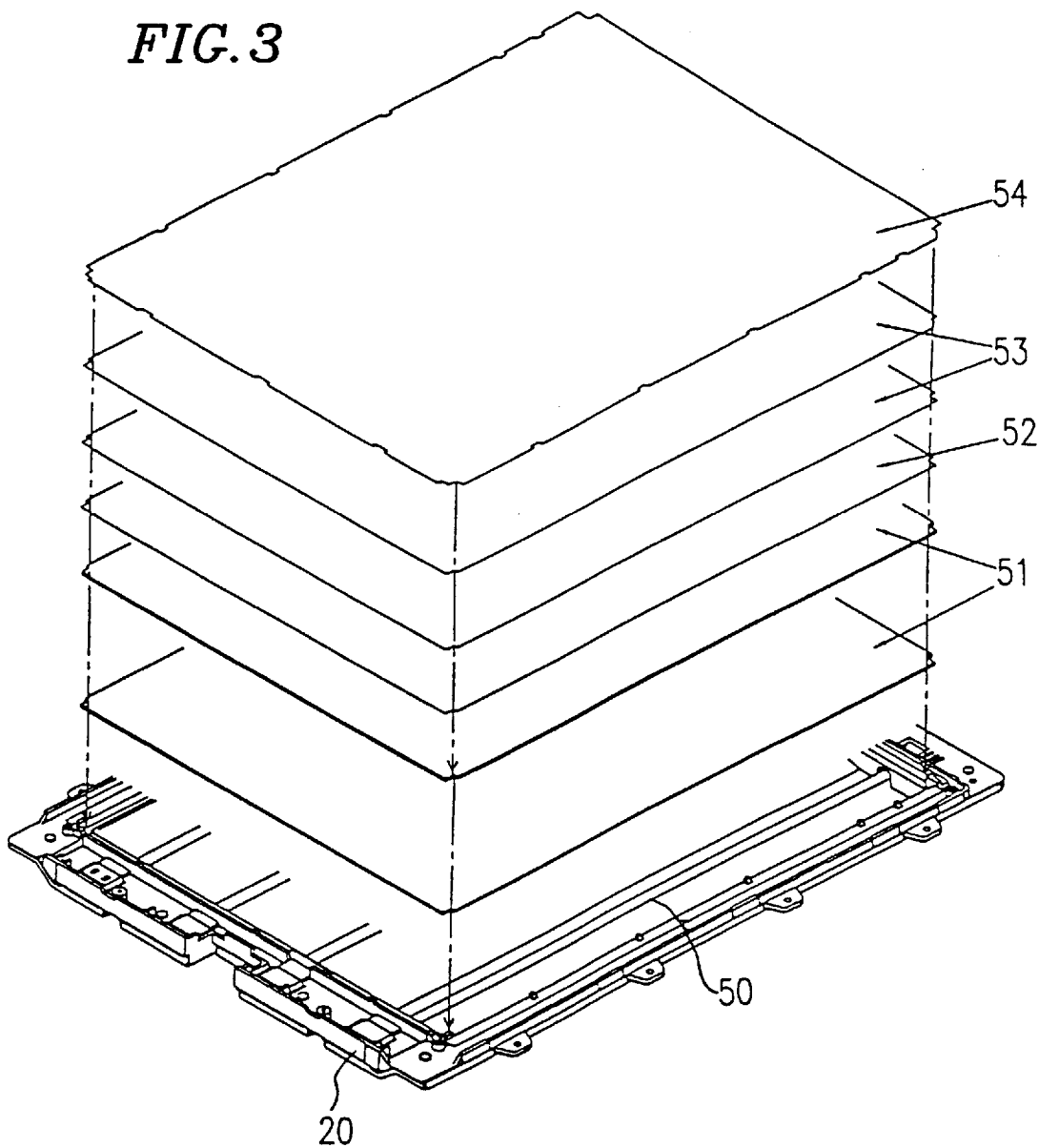

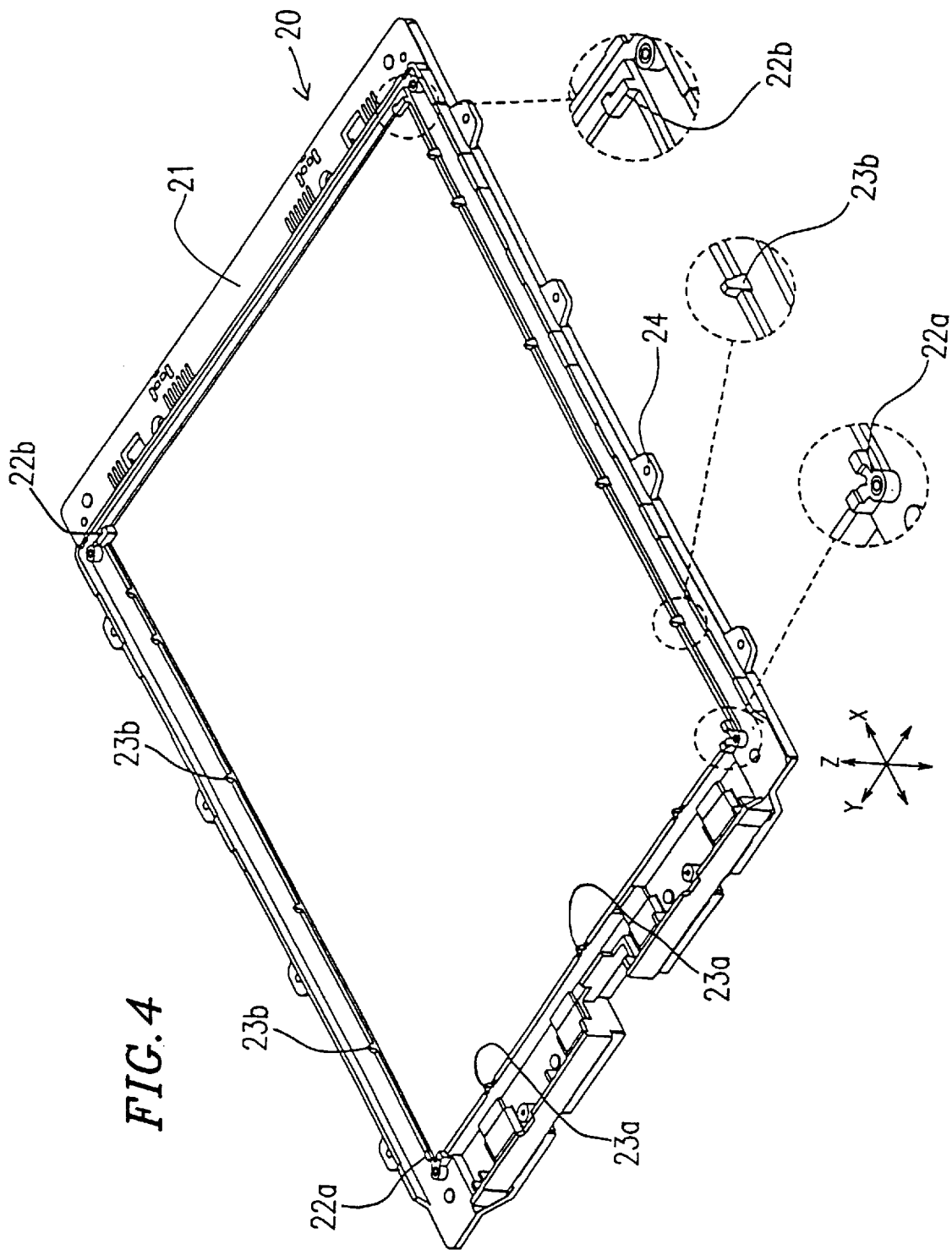

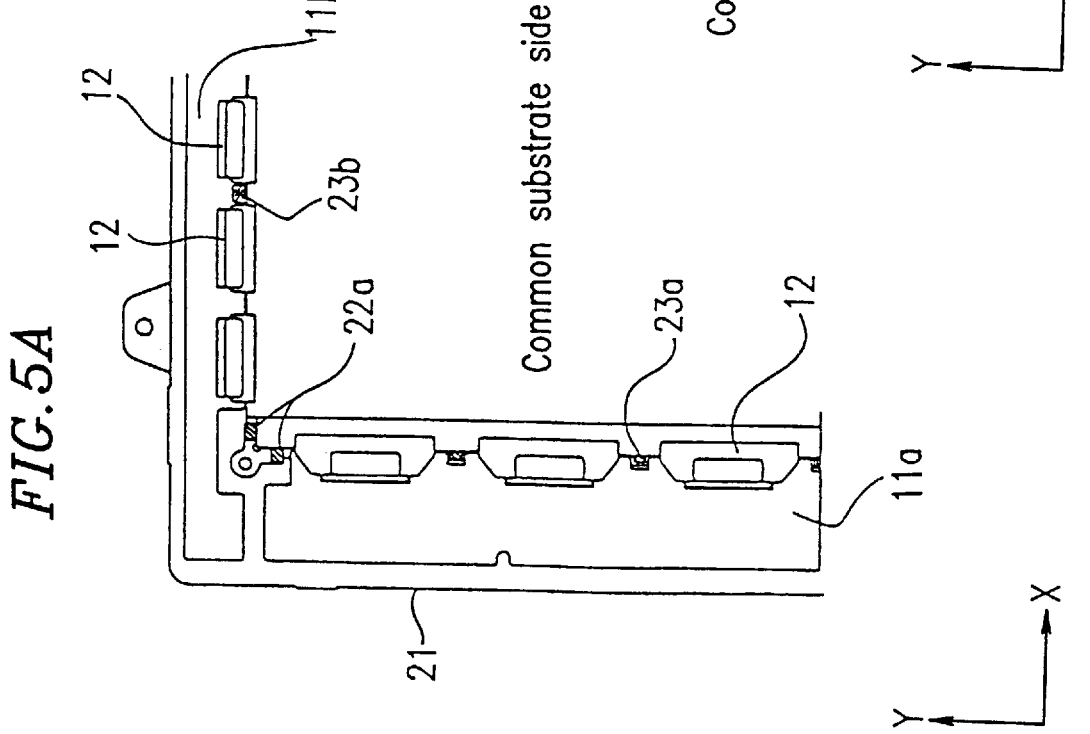

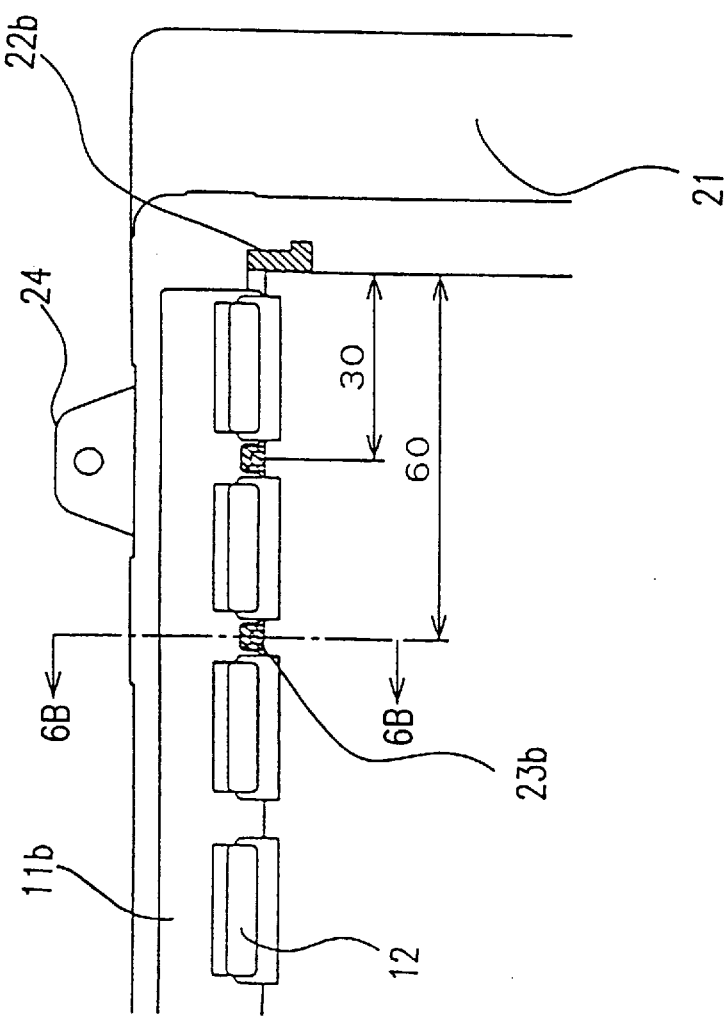
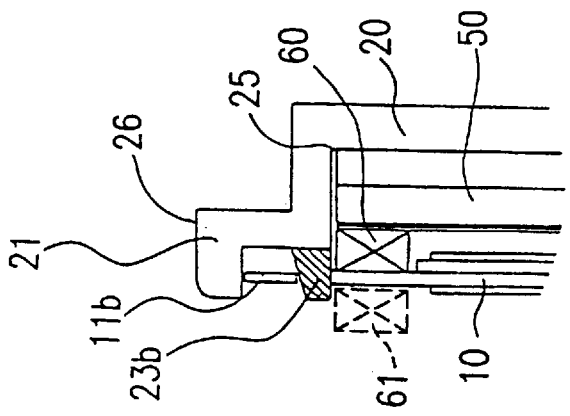
FIG. 6A
FIG. 6B

FIG. 9
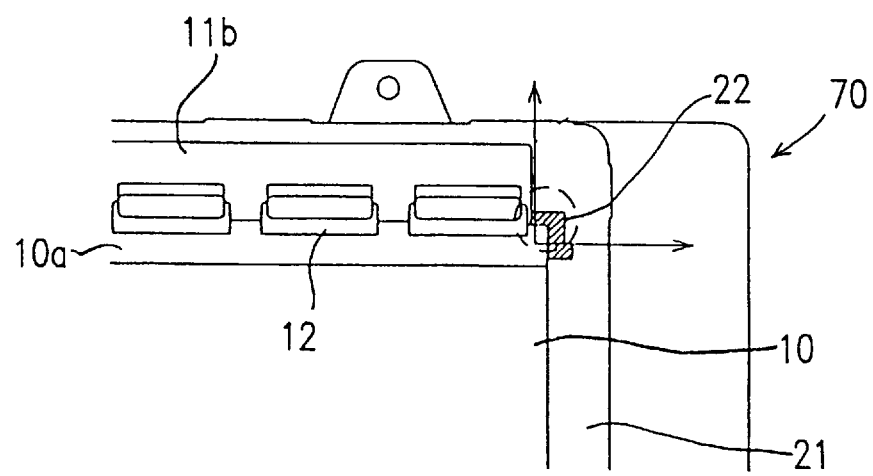
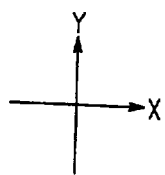

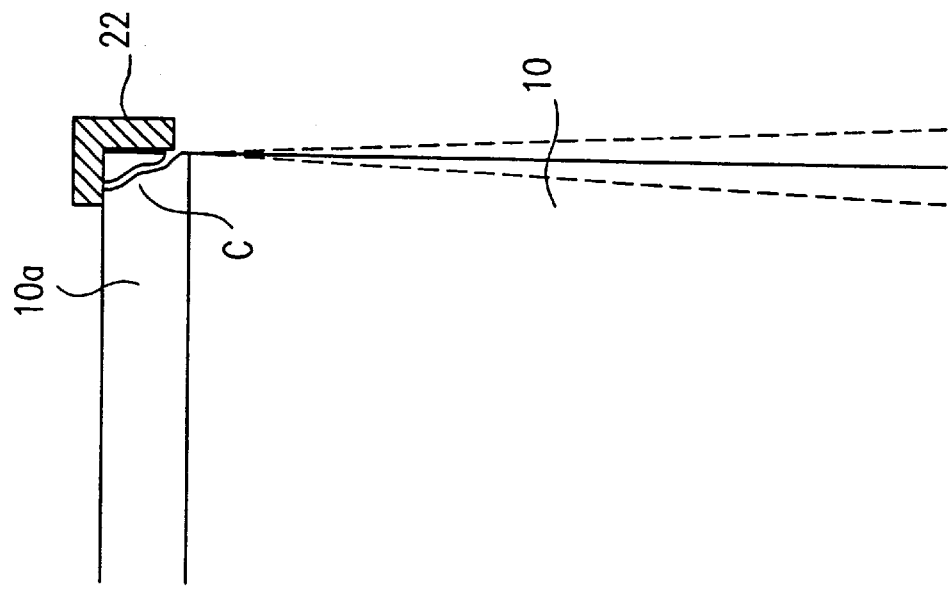
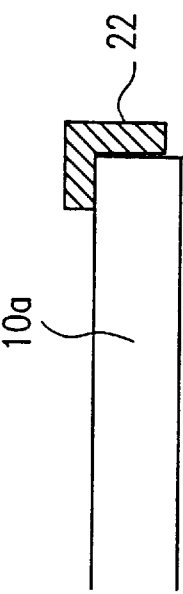
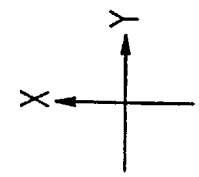
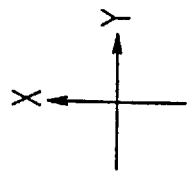

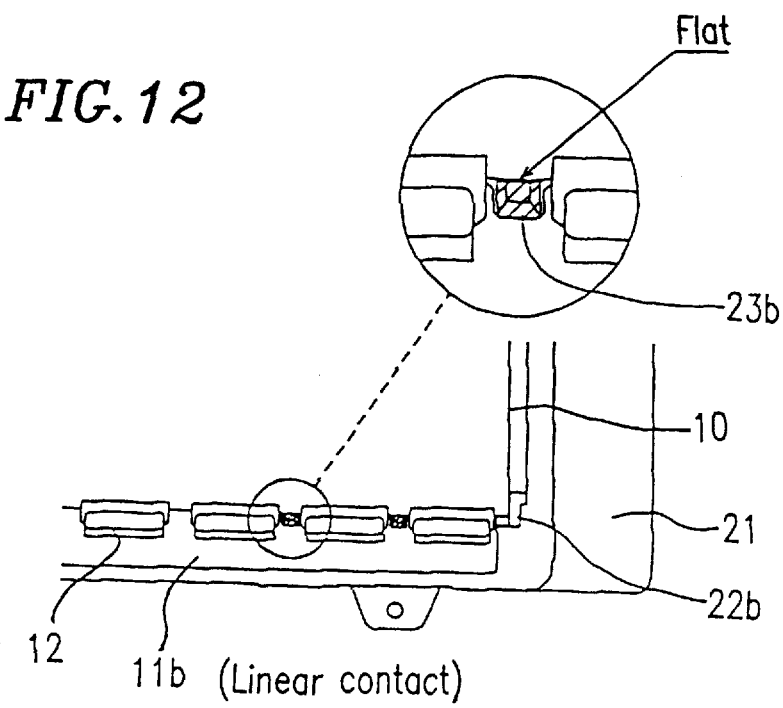
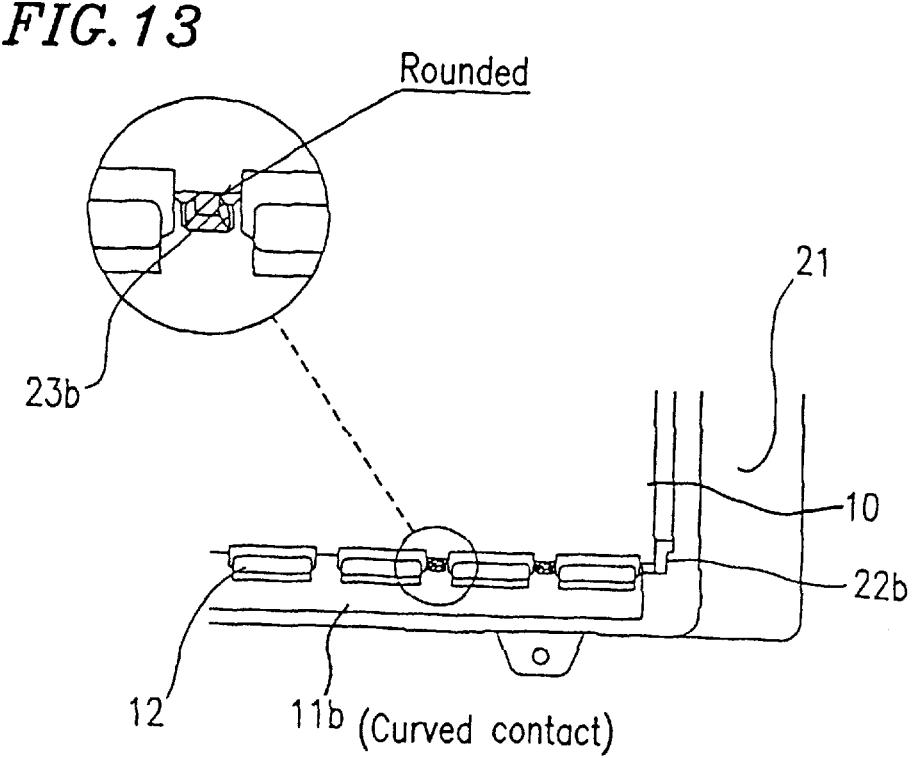

FIG.14
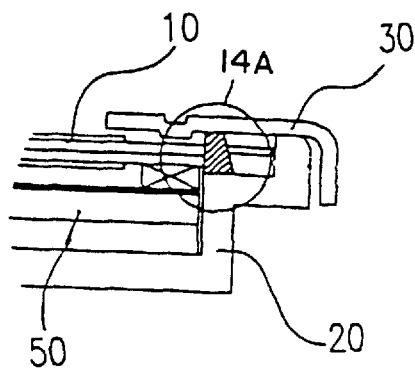
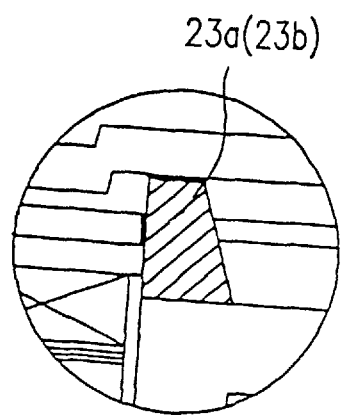
FIG.14A
FIG.15
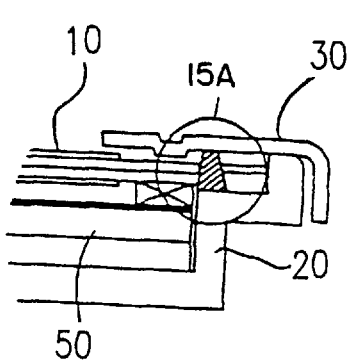
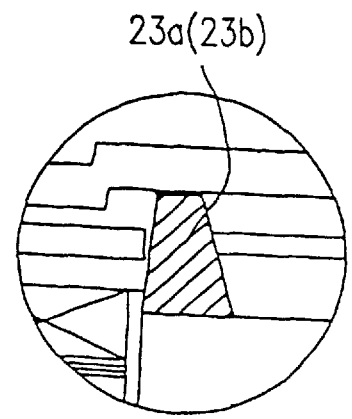
FIG.15A

HOLDING FRAME AND DISPLAY APPARATUS INCORPORATING THE SAME

BACKGROUND OF THE INVENTION

1. Field of the Invention

The present invention relates to a holding frame for holding a display device for displaying information as provided in AV apparatuses, OA terminals, billboard apparatuses, and the like and a display apparatus incorporating such a holding frame.

2. Description of the Related Art

Conventionally, a liquid crystal display apparatuses have been used as display apparatuses in portable TVs, desktop personal computers, word processors, and the like. Spacers are most commonly used as securing structures for securing a liquid crystal display device in a liquid crystal display apparatus. Such a securing structure is disclosed in, for example, Japanese Laid-open Publication No. 6-138443 and Japanese Laid-open Publication No. 6-347762.

FIG. 17 illustrates the securing structure disclosed in Japanese Laid-open Publication No. 6-138443. Referring to FIG. 17, a liquid crystal display device 4 is placed on an illuminator 2, which is located within a rectangular holding frame 1, via silicon spacers 3a interposed between the liquid crystal display device 4 and the illuminator 2. A printed board 5 surrounding the liquid crystal display device 4 is placed on the holding frame 1 via sponge spacers 3b. An upper frame 6 including a display window is placed to cover such a structure, and then the liquid crystal display device 4 is pressed from the upper surface also side via spacers 3a. Moreover, the printed board 5 is pressed from the upper surface side via the sponge spacers 3b.

In such a securing structure, the liquid crystal display device 4 is secured by being interposed between the spacers 3a, which are provided on both surfaces of the liquid crystal display device 4. The securing structure thus improves the shock resistance and the vibration resistance of the liquid crystal display device 4 in the vertical direction (i.e., the Z direction).

FIG. 18 illustrates the securing structure disclosed in Japanese Laid-open Publication No. 6-347762. Referring to FIG. 18, a liquid crystal display device 4 is placed on an illuminator 2 via a spacer 3. A spacer 8 in a stripe arrangement is attached onto a surface of a glass electrode section provided around the liquid crystal display device 4. The spacer 8 is formed of a resin thin plate and has an adhesive layer on each side. The spacer 8 is pressed via protruding portions 6a protruding downward in the inner peripheral portion of an upper frame 6.

In either one of the securing structures disclosed in Japanese Laid-open Publication Nos. 6-138443 and 6-347762, the liquid crystal display device 4 is basically secured only by being interposed between the spacers provided on both surfaces thereof. Therefore, when an impact is applied to the liquid crystal display device 4 in a lateral direction parallel to the surface thereof, i.e., when an impact or vibration is imparted in the X and/or Y directions, the liquid crystal display device 4 is likely to be displaced in that direction(s).

Referring to FIG. 17, for example, when the secured liquid crystal display device 4 is displaced in the X and/or Y directions, a force in that direction(s) is applied to a flexible circuit substrate 7, which electrically connects the liquid crystal display device 4 to the printed board 5 surrounding the liquid crystal display device 4. As a result, exfoliation or disconnection may occur in the flexible circuit substrate 7, thereby detracting from the quality of the liquid crystal display apparatus.

In order to prevent the flexible circuit substrate 7 from being damaged by the displacement of the liquid crystal display device 4, the printed board 5 in the securing structure which is disclosed in Japanese Laid-open Publication No. 6-138443 is placed on sponge spacers 3a so that the printed board 5 can move to some extent with the liquid crystal display device 4. However, when a great impact is applied externally, displacement associated with the impact is accordingly large. In such a case, the securing structure cannot reliably prevent the flexible circuit substrate 7 from being damaged.

SUMMARY OF THE INVENTION

According to one aspect of this invention, a holding frame includes a first surface, a second surface opposing the first surface, a plurality of inner sides, and a plurality of outer sides, for accommodating a display device within the plurality of inner sides. The holding frame includes at least one first protruding portion for receiving an external force applied to the display device. The at least one first protruding portion is provided on an inner edge which corresponds to one of the plurality of inner sides.

In one embodiment of the invention, the first surface includes an inner edge which corresponds to one of the plurality of inner sides.

In another embodiment of the invention, a plurality of the first protruding portions are provided on an inner edge which corresponds to one of the plurality of inner sides. Along the inner edge which corresponds to one of the plurality of inner sides, a concentration of the first protruding portions provided near an inner side which adjoins the one of the plurality of inner sides is greater than a concentration of other of the first protruding portions provided farther away from the adjoining inner side.

In still another embodiment of the invention, a plurality of the first protruding portions are provided on an inner edge which corresponds to one of the plurality of inner sides. A concentration of the first protruding portions is substantially uniform throughout the inner edge which corresponds to the one of the plurality of inner sides.

In still another embodiment of the invention, the display device includes a plurality of side faces between a display surface and a surface opposing the display surface. The first protruding portion includes a third surface which opposes one of the plurality of side faces of the display device. The third surface is parallel to one of the plurality of side faces of the display device.

In still another embodiment of the invention, the display device includes a plurality of side faces between a display surface and a surface opposing the display surface. The first protruding portion includes a curved surface which opposes one of the plurality of side faces of the display device.

In still another embodiment of the invention, a tip portion of the first protruding portion is tapered.

In still another embodiment of the invention, the holding frame according further includes a plurality of second protruding portions. One of the plurality of second protruding portions is provided on an inner edge which corresponds to one of the plurality of inner sides. Another one of the plurality of second protruding portions is provided on an inner edge which corresponds to an inner edge adjoining the one of the plurality of inner sides. The one of the plurality of second protruding portions is spaced apart from the another one of the plurality of second protruding portions by a predetermined distance.

According to another aspect of this invention, a display apparatus includes: a flat display device; a printed board provided surrounding the display device, the printed board including a driving circuit for driving the display device; a flexible circuit substrate for electrically connecting the printed board to the display device; a holding frame, which holds the display device together with the printed board and the flexible circuit substrate; and upper and lower frames for accommodating and holding the display device, the printed board, and the flexible circuit substrate.

In one embodiment of the invention, the display apparatus further includes another flexible circuit substrate which adjoins the flexible circuit substrate. One of the plurality of first protruding portions of the holding frame is located between the flexible circuit substrate and the adjoining flexible circuit substrate. The one of the plurality of first protruding portions of the holding frame fits into a notch provided in the printed board.

In another embodiment of the invention, at least one of the first protruding portions is in contact with the upper frame.

In still another embodiment of the invention, the holding frame is rectangular. A first inner edge corresponding to a first inner side of the plurality of inner sides has a second protruding portion proximate a corner of the holding frame, for receiving an external force applied to the display device. A second inner edge corresponding to a second inner side of the plurality of inner sides adjacent to the first inner side has a third protruding portion proximate the corner of the holding frame, for receiving an external force applied to the display device. The second protruding portion is separate from the third protruding portion by a predetermined distance.

The holding frame of the present invention includes at least one first protruding portion for receiving an external force applied to the display device. Thus, an impact applied to the display device is absorbed by the first protruding portion.

Therefore, even when an external impact or vibration is applied to the display device, the resulting stress is not localized to a corner of the display device. Thus, cracking will not occur in a corner of the display device.

Moreover, since the first and second protruding portions act together to hold the display device, the display device will not be displaced along the display surface of the display device even when an external impact or vibration is applied to the display device.

Furthermore, along the inner edge corresponding to one of the plurality of inner sides, the concentration of ones of the first protruding portions provided near an inner side which adjoins the one of the plurality of inner sides is greater than that of other ones of the first protruding portions provided farther away from the adjoining inner side. Thus, the stress localization to the corner of the display device may be further reduced, thereby more efficiently preventing the corner of the display device from being cracked.

Furthermore, the present invention also realizes a display apparatus having the above-described advantages.

Furthermore, the first protruding portions may be provided with a function to hold a printed board. In such a case, the number of members to be provided for holding the printed board may be reduced, thereby reducing the cost of the display device.

Furthermore, the first protruding portions may be in contact with the upper frame. In such a case, positioning of the upper frame can be conducted after the display device, the printed board, the flexible circuit substrate, and the holding frame have been integrated with the upper frame. Since the upper frame may be positioned properly, deformation of the upper frame which may occur when, for example, screwing the upper frame can be avoided.

Thus, the invention described herein makes possible the advantages of: (1) providing a holding frame which can reliably prevent a display device from being damaged by displacement of the display device occurring when an impact is applied externally and a localized stress to the display device; and (2) providing a display apparatus incorporating such a holding frame.

These and other advantages of the present invention will become apparent to those skilled in the art upon reading and understanding the following detailed description with reference to the accompanying figures.

BRIEF DESCRIPTION OF THE DRAWINGS

FIG. 3 is an exploded isometric view illustrating a configuration of an illuminator.

FIG. 4 is an isometric view illustrating a configuration of a holding frame according to the example of the present invention.

FIG. 5A is a view illustrating a common-substrate-side portion of the display apparatus according to the example of the present invention as viewed from the upper surface side.

FIG. 5B is a view illustrating a counter-common-substrate-side portion of the display apparatus according to the example of the present invention as viewed from the upper surface side.

FIG. 6A is a view illustrating a portion of the display apparatus according to the example of the present invention as viewed from the upper surface side.

FIG. 6B is a cross-sectional view illustrating the display apparatus illustrated in FIG. 6A taken along the 6B—6B line in FIG. 6A.

FIG. 9 is a view illustrating a stress applied to a first protruding portion of the holding frame according to the example of the present invention.

FIG. 10A is a schematic diagram illustrating a configuration of a portion of the holding frame illustrated in FIG. 7.

FIG. 10B is a schematic diagram illustrating a configuration of a portion of the holding frame illustrated in FIG. 7 after an impact has been applied to the holding frame.

FIG. 12 is a view illustrating a first example of the first protruding portion of the holding frame according to the example of the present invention.

FIG. 13 is a view illustrating a second example of the first protruding portion of the holding frame according to the example of the present invention.

FIG. 14 is a view illustrating a third example of the first protruding portion of the holding frame according to the example of the present invention.

FIG. 15 is a view illustrating a fourth example of the first protruding portion of the holding frame according to the example of the present invention.

DESCRIPTION OF THE PREFERRED EMBODIMENTS

Hereinafter, the present invention will be described by way of illustrative examples with reference to the accompanying figures.

Figure 1:
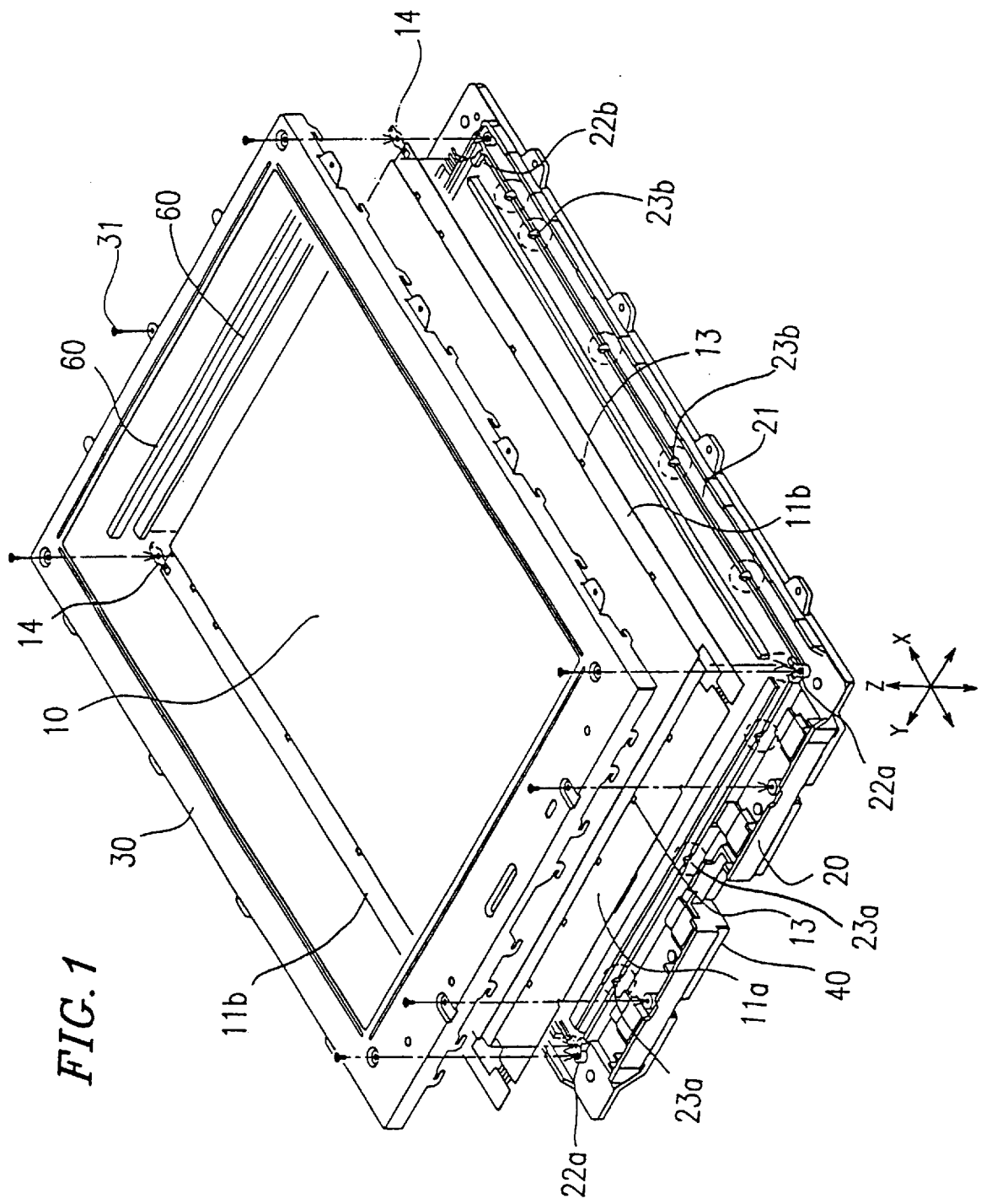
FIG. 1 is an exploded isometric view illustrating a display apparatus according to an example of the present invention as viewed from the upper surface side.
Figure 2:
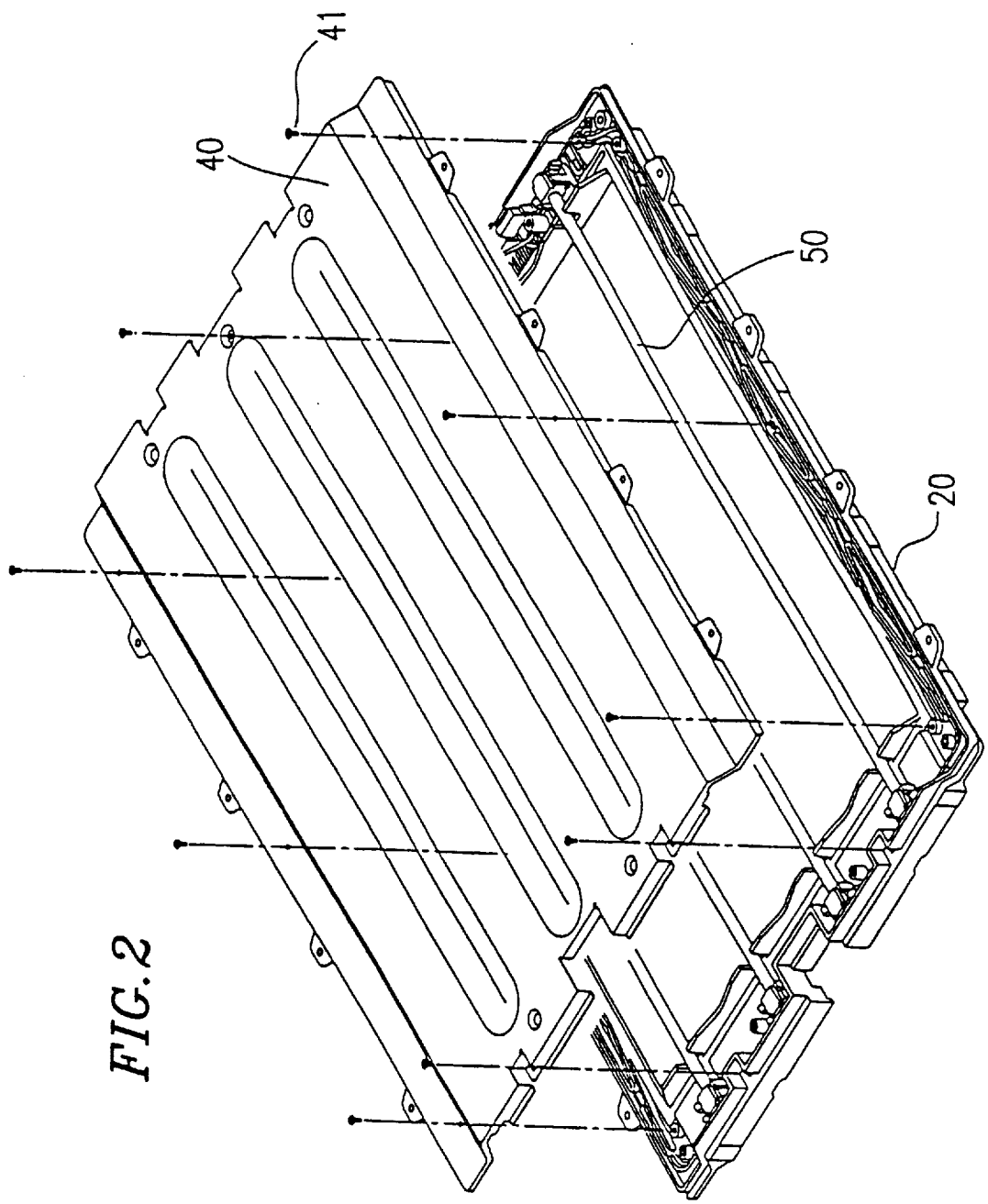
FIG. 2 is an exploded isometric view illustrating a display apparatus according to the example of the present invention as viewed from the top surface side.

FIGS. 1 and 2 illustrate an example of the present invention, where the present invention is applied to a simple matrix type liquid crystal display apparatus. The liquid crystal display apparatus illustrated in FIGS. 1 and 2 includes an upper frame 30, a liquid crystal display device 10, a holding frame 20, and a lower frame 40. There components are integrated together by screws, while the upper frame 30 is fixed to the lower frame 40 by caulking the upper frame 30.

The liquid crystal display device 10 is substantially rectangular in shape. Printed boards (i.e., a common substrate 11a and segment substrates 11b) are provided surrounding the liquid crystal display device 10. More particularly, the common substrate 11a is provided along one of the short sides of the liquid crystal display device 10, and is electrically connected with the liquid crystal display device 10 via a flexible circuit substrate 12 (not shown).

The segment substrates 11b are respectively provided along the long sides of the liquid crystal display device 10, which are opposite to each other. The segment substrates 11b are electrically connected with the liquid crystal display device 10 via the flexible circuit substrate 12 (see FIG. 6A). A ground terminal 14 is provided at one end of each segment substrate 11b.

In the following description, a direction parallel to the long side of the liquid crystal display device 10 will be referred to as the X direction, while a direction parallel to the short side of the liquid crystal display device 10 will be referred to as the Y direction, and the thickness direction referred to as the Z direction. Moreover, one of the short sides of the liquid crystal display device 10 along which the common substrate 11a is provided will be referred to as the common substrate side, while the other short side opposite the common substrate side will be referred to as the counter common substrate side.

The liquid crystal display device 10 is held in a liquid crystal display apparatus by means of the holding frame 20 of the present invention. The holding frame 20 is accommodated between the upper frame 30 including a display window, and the tray type lower frame 40. The upper frame 30 is attached onto the upper surface of the holding frame 20 by screws 31 and caulking. The lower frame 40 is attached onto the rear surface of the holding frame 20 by screws 41, as shown in FIG. 2. A plurality of light sources 50 are attached onto the rear surface of the holding frame 20. As shown in FIG. 3, diffusion plates 51, a diffusion sheet 52, lenses 53, and a protective sheet 54 are layered in this order on the light sources 50, with each two adjacent layers interposing an air layer. The liquid crystal display device 10 is provided on the illuminator having such a configuration.

Hereinafter, the configuration of the holding frame 20 will be described with reference to FIGS. 4, 6A and 6B.

FIG. 4 illustrates the holding frame 20 according to the present example.

The holding frame 20 includes a first surface 21, a second surface (not shown) opposing the first surface 21, a plurality of protrusions 24, a plurality of inner sides 25 (FIG. 6B) surrounding an opening of the holding frame 20, a plurality of outer sides 26 (FIG. 6B), first protruding portions 23a and 23b, and second protruding portions 22a and 22b. The first surface 21 includes inner and outer edge portions near the inner and outer sides 25 and 26, respectively.

The liquid crystal display device 10 is inserted within the opening of the holding frame 20.

Each of the protrusions 24 includes a screw hole for attaching the upper frame 30 to the lower frame 40. The protrusions 24 are provided only on ones of the outer sides 26 which extend along the X direction. The protrusions 24 may also be provided on every one of the plurality of outer sides 26.

At least one of the second protruding portions 22a and 22b is provided on each inner edge portion corresponding to the respective inner side 25. Therefore, the liquid crystal display device 10 can be secured by the second protruding portions 22a and 22b alone. The second protruding portions 22a and 22b protrude in the Z direction.

A plurality of the first protruding portions 23a or 23b are provided on each inner edge portion corresponding to the respective inner sides 25 in order to hold the liquid crystal display device 10. As shown in FIG. 4, the first protruding portions 23a and 23b do not have to be provided on one of the inner sides 25 near the counter common substrate side. The first protruding portions 23a and 23b protrude in the Z direction.

As shown in FIG. 5A, the second protruding portion 22a on the common substrate side is bent at a right angle as viewed from above, and includes two receptacles which are respectively in contact with the two end faces extending from a corner of the liquid crystal display device 10. In other words, the second protruding portion 22a located on the inner edge portion which corresponds to the inner side extending in the X direction is spaced apart by a predetermined distance from the second protruding portion 22a located on the inner edge portion which corresponds to the inner side extending in the Y direction. The predetermined distance may be equal to about ½ to 5 times the length of the second protruding portion. The length of the second protruding portion may be defined as the length of the second protruding portion in the X direction or the length of the second protruding portion in the Y direction.

The protruding portions 23a of the present example are provided along the Y direction at regular intervals so as to be in contact with an end face of the liquid crystal display device 10 on the common substrate side.

Referring to FIGS. 5B, 6A and 6B, the two second protruding portions 22b are located on the inner edge portion which corresponds to the inner side of the counter common substrate side. The second protruding portions 22b are in contact with a surface of the liquid 3crystal display device 10 extending in the Y direction.

Basically, the first protruding portions 23b are arranged at regular intervals on the inner edge portion excluding the inner edge portion which corresponds to the inner side of the counter common substrate side. Herein, along the inner edge portion extending in the X direction, the concentration of the first protruding portions 23b near the counter common substrate side is greater than that of the first protruding portions 23b near the common substrate side. Moreover, along the inner edge portion extending in the X direction, the concentration of the first protruding portions 23b near the counter common substrate side may be greater than that of the first protruding portions 23b around the center of the inner edge portion. This is due to the fact that the second protruding portions 22b on the counter common substrate side do not have a function to secure the liquid crystal display device 10 in the Y direction, but the first protruding portions 23b have the function.

Herein, on the counter common substrate side the second protruding portions 22b do not function to secure the liquid crystal display device 10 in the Y direction, while on the common substrate side each of the second protruding portions 22a secures the liquid crystal display device 10 in the X and Y directions. Therefore, even when an external impact is applied in the Y direction, a stress is not localized to the corner of the liquid crystal display device 10, thereby preventing the corner from being cracked. That is, when the second protruding portions 22b on the counter common substrate side are formed in the above-described shape, the liquid crystal display device 10 will not be secured in the Y direction, whereby an impact in the Y direction is received by a plurality of the first protruding portions 23b. Thus, the resulting stress applied to the liquid crystal display device 10 is dispersed and will not be localized to the corner, thereby reliably preventing the corner from being cracked.

Moreover, the first protruding portions 23a and 23b are located between two adjacent flexible circuit substrates 12 (see FIG. 5A). Notches 13 (see FIG. 1) are provided along the inner edge portions of the common substrate 11a and the segment substrate 11b into which the first protruding portions 23a and 23b fit. Therefore, the first protruding portions 23a and 23b also function to hold the substrates 11a and 11b.

In, a liquid crystal display apparatus incorporating the above-described holding frame 20, the liquid crystal display device 10 is held and secured as follows.

Referring briefly to FIG. 6B, spacers 60 are placed on the light sources 50 along the inner side of the holding frame 20. The liquid crystal display device 10 is placed on the spacers 60. The liquid crystal display device 10 is located to be surrounded by the second protruding portions 22a and 22b and the first protruding portions 23a and 23b of the holding frame 20. Additional spacers 61 are placed opposite the spacers 60 so as to interpose the liquid crystal display device 10 therebetween. The upper frame 30 is attached to the holding frame 20. Thus, the liquid crystal display device 10 is held by the spacers 60 so as to be secured in the Z direction. Moreover, the liquid crystal display device 10 is secured by the spacers 60 to some degree in the X and Y directions.

Furthermore, the liquid crystal display device 10 is reliably positioned in the X and Y directions by the second protruding portions 22a and 22b and the first protruding portions 23a and 23b of the holding frame 20. Furthermore, in the Y direction, the liquid crystal display device 10 is held by a plurality of first protruding portions 23b provided along the inner edge portion which corresponds to the inner side extending in the X direction.

Hereinafter, the effects of the present example will be described while comparing a stress applied to the holding frame 20 of the present example with a stress applied to a holding frame which is not in accordance with the present invention.

Figure 7:
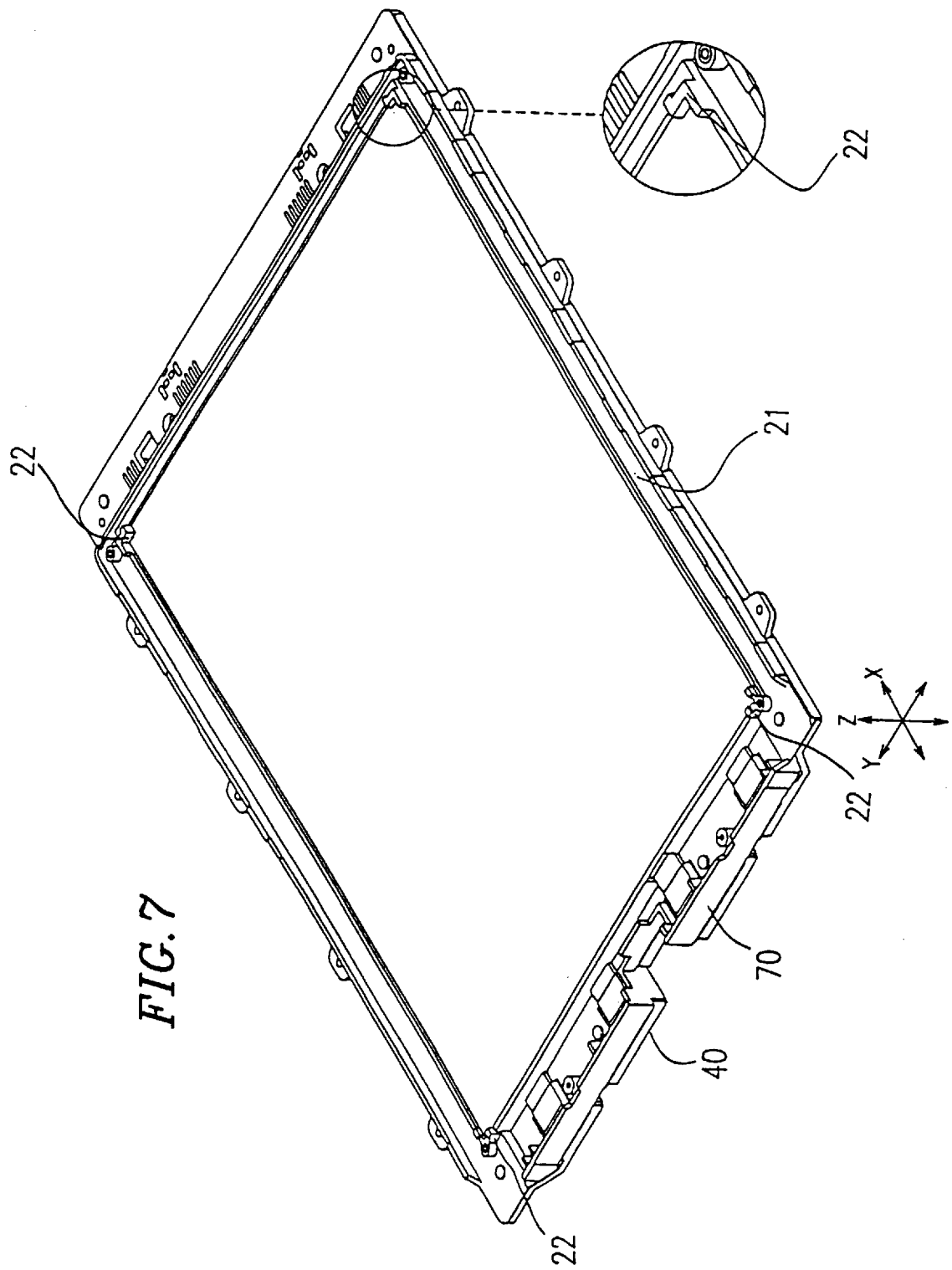
FIG. 7 is an isometric view illustrating a configuration of a holding frame.
Figure 8:
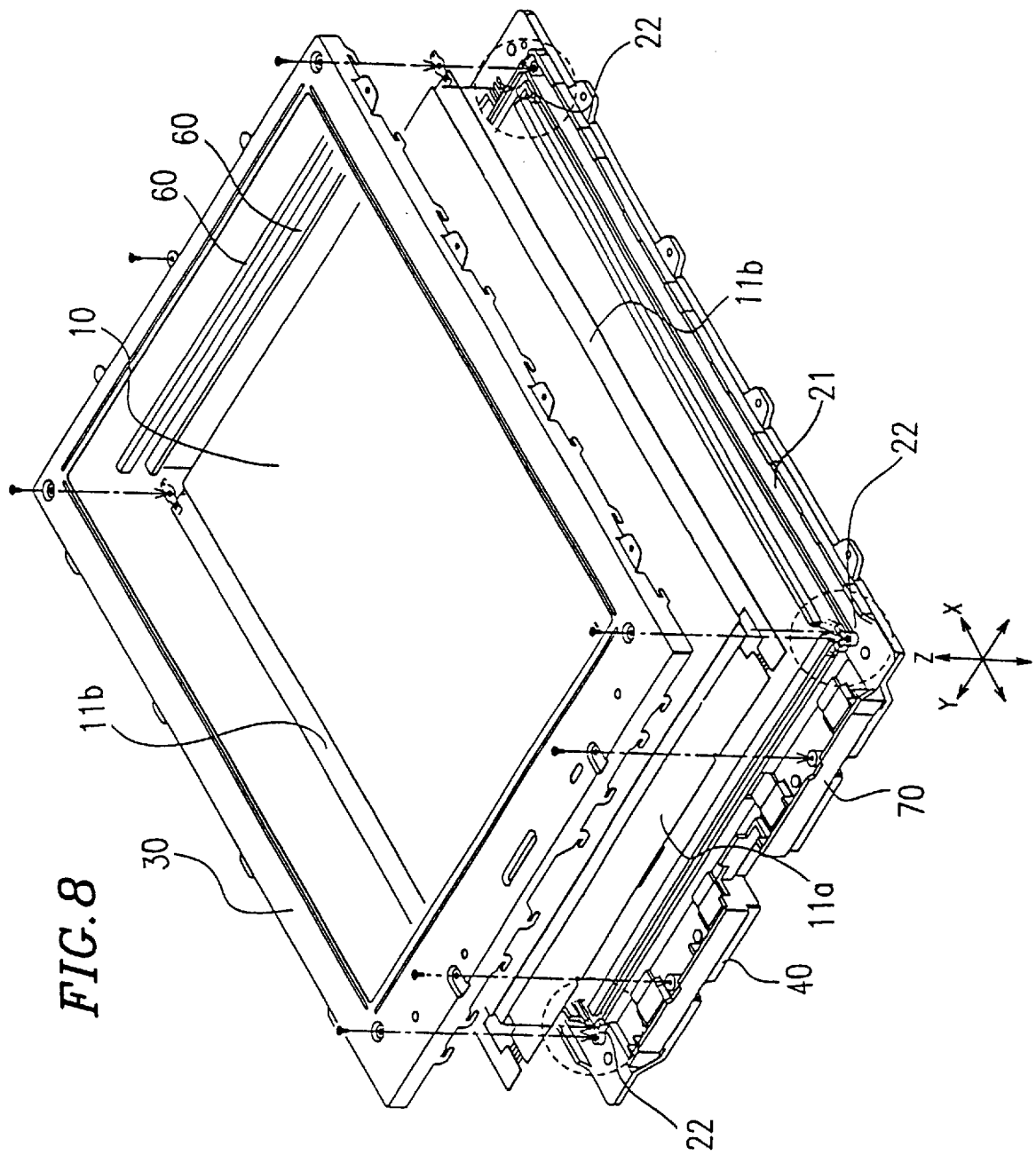
FIG. 8 is an isometric view illustrating a configuration of a display apparatus incorporating the holding frame illustrated in FIG. 7.

FIG. 7 illustrates a holding frame 70 which is not in accordance with the present invention, while FIG. 8 illustrates a liquid crystal display apparatus in which a liquid crystal display device is secured by the holding frame 70. The configuration of the liquid crystal display apparatus illustrated in FIG. 8 will not be described in detail since it is the same as that of the liquid crystal display apparatus illustrated in FIG. 1 except for the holding frame 70.

In the holding frame 70 illustrated in FIG. 7, the liquid crystal display device 10 is reliably positioned in the X and Y directions by four second protruding portions 22 provided on the inner edge portions which correspond to the four corners of the inner sides of the holding frame 70.

The liquid crystal display device 10 is in a rigid-body contact with the holding frame 70. Therefore, as shown in FIG. 9, when an impact or vibration is externally applied to the liquid crystal display device 10 in the X or Y direction, a stress is localized to the corner of the liquid crystal display device 10 (particularly, to the corner of a glass electrode section 10a). Thus, the corner of the liquid crystal display device 10 may easily be damaged.

As described above, in the holding frame 20 according to the example of the present invention, on the counter common substrate side, the second protruding portions 22b do not function to secure the liquid crystal display device 10 in the Y direction, while on the common substrate side the second protruding portions 22a secure the liquid crystal display device 10 in the X and Y directions, respectively. Therefore, even when an external impact is applied in the Y direction, the resulting stress is not localized to the corner of the liquid crystal display device 10, thereby preventing the corner from being cracked. Similarly, when an external impact is applied to the holding frame 20 in the X direction, a stress is not localized to the corner of the liquid crystal display device 10.

The length of the liquid crystal display device 10 illustrated in FIG. 7 in the X direction is greater than the length in the Y direction. Therefore, as shown in FIGS. 10A and 10B, for a certain impact, a stress is easily localized particularly in the Y direction. As a result, in such a securing structure, when an impact or vibration is externally applied to the liquid crystal display device 10, a stress exceeding an acceptable value may easily be applied to the corner in the Y direction. This may result in a crack (stress crack) C in the corner as shown in FIG. 10B.

Figure 11:
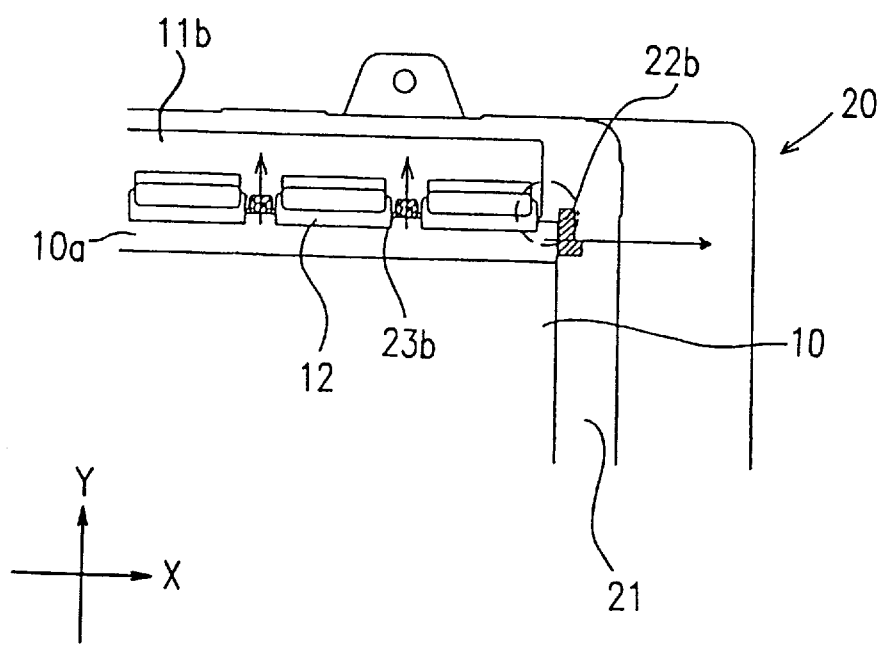
FIG. 11 is a view illustrating a stress applied to a protruding portion of the holding frame illustrated in FIG. 6A.

In the holding frame 20 of the present example, a plurality of the first protruding portions 23a are provided on the inner edge portion which corresponds to the inner side extending in the X direction. Therefore, it is possible to disperse and absorb the stress in the Y direction as illustrated in FIG. 11.

Due to such a configuration, while the liquid crystal display device 10 is reliably secured in the X and Y directions, the holding frame 20 of the present invention may prevent the corner from being damaged.

The first protruding portions 23a and 23b may be configured as described in (1) or (2) below.

(1) The surface of the first protruding portions 23a and 23b opposing the end face of the liquid crystal display device 10 is flat (FIG. 12). In such a case, the first protruding portions 23a and 23b will be in a surface contact with the end face of the liquid crystal display device 10, thereby realizing an increased effect of holding the liquid crystal display device 10.

(2) The surface of the first protruding portions 23a and 23b opposing the end face of the liquid crystal display device 10 is curved (FIG. 13). In such a case, the first protruding portions 23a and 23b will be in a linear contact with the end face of the liquid crystal display device 10, whereby the liquid crystal display device 10 may be easily taken out from the holding frame 20.

Alternatively, the surface of the first protruding portions 23a and 23b opposing the end face of the liquid crystal display device 10 may be parallel to the end face of the liquid crystal display device 10 (FIG. 14). Moreover, the surface of the first protruding portions 23a and 23b opposing the end face of the liquid crystal display device 10 may be sloped so as to face upwards (FIG. 15). Herein, when the surface of the first protruding portions 23a and 23b opposing the end face of the liquid crystal display device 10 is sloped so as to face upwards, there is provided an advantage that the liquid crystal display device 10 may be easily taken out from the holding frame 20.

In the present example, the first protruding portions 23a and 23b are configured so as to be in contact with the lower surface of the upper frame 30 with the liquid crystal display apparatus being assembled. Due to such a configuration, the upper frame 30 may be positioned with the liquid crystal display apparatus being assembled. As a result, unexpected deformation of the upper frame 30 can be avoided.

A description for materials and a production method of the components of the liquid crystal display apparatus now follows.

First, an ABS resin is used as the material of the holding frame 20. This material is inexpensive compared to Lexan, while the fluidity thereof during a molding process is excellent. Therefore, the quality of the product can be maintained stably. Regarding the color of the material, in addition to white, a color having a light blocking property such as black may be used.

Figure 16:
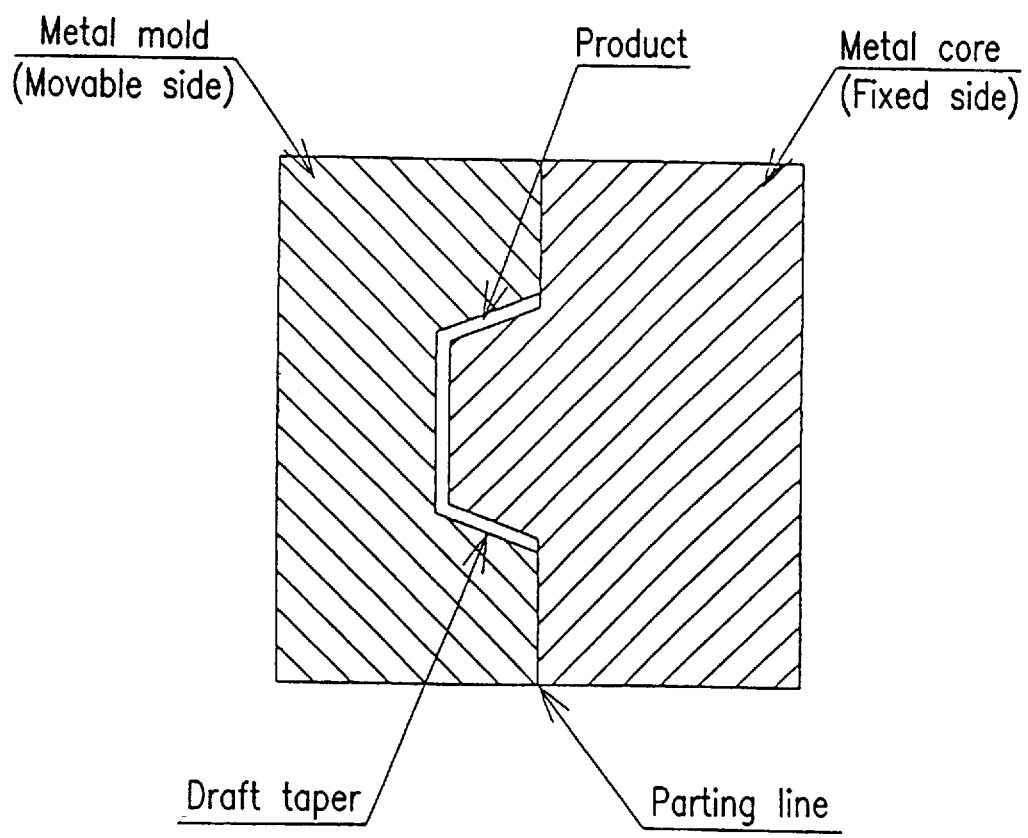
FIG. 16 is a cross-sectional view illustrating an example of a metal mold which may be used for producing the holding frame according to the example of the present invention.
Figure 17:
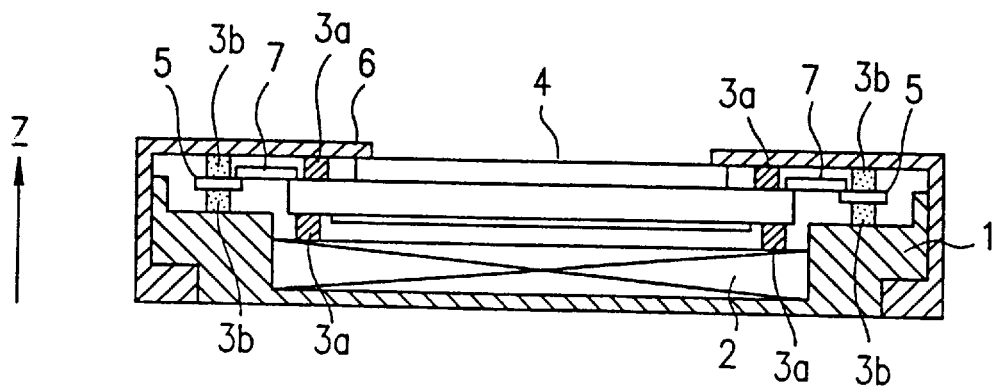
FIG. 17 is a cross-sectional view illustrating a conventional display apparatus.
Figure 18:
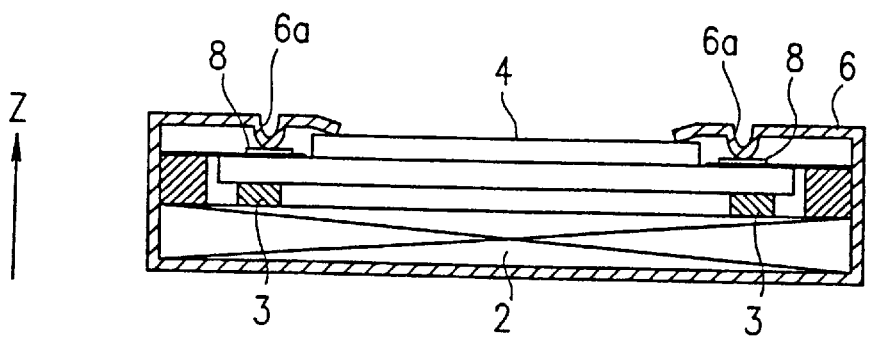
FIG. 18 is a cross-sectional view illustrating another conventional display apparatus.

Injection molding may be employed as the production method of the holding frame 20. In such a case, it is preferable to provide a large taper as shown in FIG. 16. In this way, the mold release from a parting line is improved, thereby reducing defective products. Moreover, the load applied to the metal mold is decreased, whereby products of a constant shape can be produced even if the same metal mold is used for a long period of time.

The upper frame 30 can be produced by pressing an electric-melting zinc plated plate (SECC). Moreover, in view of the cost, the cost of the electric-melting zinc plated plate (SECC) is less than that of stainless steel.

Aluminum may be used for the lower frame 40. It is applicable to form a reflective layer in the lower frame 40 by painting the inner surface white, or by attaching a reflective sheet (e.g., Product No. E-60L: Toray Industries, Inc.) using an acrylic adhesive.

The spacer 60 is made of silicon rubber having a rigidity of about 20. By integrating it with a PET tape, it can be used as the second protruding portion and as a dust-blocking member of the liquid crystal display device 10. A light-blocking color such as black may be applicable for the spacer. Four lamps each having a diameter of about 3.0 mm (e.g., Harrison Denki K. K.) may be used for the light sources 50. The diffusion plates 51 may be provided by processing milky white acrylic resin (e.g., Product No. N961: Mitsubishi Rayon Co., Ltd.). A printed pattern provided on each side of the diffusion plates 51 may enhance the uniformity of light emitted from the light source, while blurring the shadow of the light source. A printed pattern such as Product No. SH-1150128U-15 (Taiho Kogyo Co., Ltd.) may be used for the printed pattern on the display device side, while a printed pattern such as Product No. SH-1150115L-15 (Taiho Kogyo Co., Ltd.) may be used for the printed pattern on the light source side.

A diffusion sheet such as Product No. D111T (Tsujimoto Denki K. K.) using a polycarbonate and having a thickness of about 140 $\mu$m may be used for the diffusion sheet 52.

The lens 53 may be provided by layering two lenses such as Product No. BEF2 (Sumitomo 3M Ltd.). Particularly, a lens having a convex pitch of about 24 $\mu$m and a thickness of about 140 $\mu$m may be provided on the display device side, while a lens having a convex pitch of about 50 $\mu$m and a thickness of about 155 $\mu$m may be provided on the light source side. The convex portions may be provided so as to face the display device side while crossing each other.

A protective sheet such as Production No. D117U (Tsujimoto Denki K. K.) using PET and having a thickness of about 130 $\mu$m may be used for the protective sheet 54. The protective sheet 54 may function to protect the lens and to block dust from entering the apparatus.

OTHER EXAMPLES

In the above-described example, the second protruding portions act to position (or fix) the liquid crystal display device 10 in the X direction while movably supporting the liquid crystal display device 10 in the Y direction. However, it is also applicable that the second protruding portions act to position (or fix) the liquid crystal display device 10 in both the X and Y directions, because, also in such a case, it is possible to prevent a stress from being localized to the corner of the liquid crystal display device 10 by providing the first protruding portion on each side.

Moreover, in the above-described example, the first protruding portions are provided on the two long sides and one of the short sides of the holding frame 20. The purpose of the configuration is to give the first protruding portion a function of holding the printed boards. However, solely in order to prevent the corner of the liquid crystal display device 10 from being cracked, the first protruding portion may be provided only on one of the long sides.

Furthermore, it is also applicable to provide the first protruding portion on two of the long sides as well as two of the short sides. In such a case, cracking is more reliably prevented from occurring in the Y direction and also in the X direction.

Furthermore, in the above-described example, the case where the present invention is applied to a simple matrix type liquid crystal display apparatus has been described. However, the present invention may similarly be applied to an active matrix type liquid crystal display apparatus. Further, the display device to which the present invention is applicable is not limited to a liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A holding frame comprising a first surface, a second surface opposing the first surface, a plurality of inner sides, and a plurality of outer sides, for accommodating a display device within the plurality of inner sides, wherein:

the holding frame includes at least one first protruding portion for receiving an external force applied to the display device; and the at least one first protruding portion is provided on an inner edge which corresponds to one of the plurality of inner sides.

2. A holding frame according to claim 1, wherein the first surface includes an inner edge which corresponds to one of the plurality of inner sides.

3. A holding frame according to claim 2, wherein:

a plurality of the first protruding portions are provided on an inner edge which corresponds to one of the plurality of inner sides; and along the inner edge which corresponds to one of the plurality of inner sides, a concentration of the first protruding portions provided near an inner side which adjoins the one of the plurality of inner sides is greater than a concentration of other of the first protruding portions provided farther away from the adjoining inner side.

4. A holding frame according to claim 2, wherein:

a plurality of the first protruding portions are provided on an inner edge which corresponds to one of the plurality of inner sides; and a concentration of the first protruding portions is substantially uniform throughout the inner edge which corresponds to the one of the plurality of inner sides.

5. A holding frame according to claim 1, wherein:

the display device includes a plurality of side faces between a display surface and a surface opposing the display surface;

the first protruding portion includes a third surface which opposes one of the plurality of side faces of the display device; and the third surface is parallel to one of the plurality of side faces of the display device.

6. A holding frame according to claim 1, wherein:

the display device includes a plurality of side faces between a display surface and a surface opposing the display surface; and the first protruding portion includes a curved surface which opposes one of the plurality of side faces of the display device.

7. A holding frame according to claim 1, wherein a tip portion of the first protruding portion is tapered.

8. A holding frame according to claim 1, further comprising a plurality of second protruding portions, wherein:

one of the plurality of second protruding portions is provided on an inner edge which corresponds to one of the plurality of inner sides;

another one of the plurality of second protruding portions is provided on an inner edge which corresponds to an inner edge adjoining the one of the plurality of inner sides; and the one of the plurality of second protruding portions is spaced apart from the another one of the plurality of second protruding portions by a predetermined distance.

9. A display apparatus comprising:

a flat display device;

a printed board provided surrounding the display device, the printed board including a driving circuit for driving the display device;

a flexible circuit substrate for electrically connecting the printed board to the display device;

a holding frame according to claim 1, which holds the display device together with the printed board and the flexible circuit substrate; and upper and lower frames for accommodating and holding the display device, the printed board, and the flexible circuit substrate.

10. A display apparatus according to claim 9, further comprising another flexible circuit substrate which adjoins the flexible circuit substrate, wherein:

one of the plurality of first protruding portions of the holding frame is located between the flexible circuit substrate and the adjoining flexible circuit substrate; and the one of the plurality of first protruding portions of the holding frame fits into a notch provided in the printed board.

11. A display apparatus according to claim 9, wherein at least one of the first protruding portions is in contact with the upper frame.

12. A holding frame according to claim 1, wherein the holding frame is rectangular, a first inner edge corresponding to a first inner side of the plurality of inner sides has a second protruding portion proximate a corner of the holding frame, for receiving an external force applied to the display device, a second inner edge corresponding to a second inner side of the plurality of inner sides adjacent to the first inner side has a third protruding portion proximate the corner of the holding frame, for receiving an external force applied to the display device, and the second protruding portion is separate from the third protruding portion by a predetermined distance.

* * * * *